United States Patent [19]

Bernstein et al.

[11] Patent Number: 4,622,757
[45] Date of Patent: Nov. 18, 1986

[54] COGENERATION MICROWAVE FOOD DRYER

[75] Inventors: Samuel Bernstein, Bellevue; Kenji Ushimaru, Seattle, both of Wash.

[73] Assignee: Energy International, Inc., Bellevue, Wash.

[21] Appl. No.: 685,462

[22] Filed: Dec. 24, 1984

[51] Int. Cl.⁴ .............................................. F26B 3/347
[52] U.S. Cl. ............................................. 34/1; 34/68; 34/86; 34/80; 219/10.55 A
[58] Field of Search .......................... 34/1, 68, 86, 80; 219/10.55 R, 10.55 A, 10.69

[56] References Cited

U.S. PATENT DOCUMENTS

| | | | |
|---|---|---|---|
| 2,419,875 | 4/1947 | Birdseye | 34/216 |
| 3,409,447 | 11/1968 | Jeppson | 99/221 |
| 3,555,693 | 1/1971 | Futer | 34/1 |
| 3,611,582 | 10/1971 | Hamid | 34/1 |
| 3,635,455 | 1/1972 | Johnson | 263/52 |
| 3,872,603 | 3/1975 | Williams et al. | 34/1 |
| 4,003,139 | 1/1977 | Van Winkle | 34/86 |
| 4,045,638 | 8/1977 | Chiang et al. | 34/1 |
| 4,240,581 | 12/1980 | Fowler | 34/86 |
| 4,252,487 | 2/1981 | Jeppson | 404/77 |
| 4,319,856 | 3/1982 | Jeppson | 404/79 |
| 4,347,016 | 8/1982 | Sindelar | 404/95 |
| 4,405,850 | 9/1983 | Edgar | 219/10.55 A |
| 4,409,453 | 10/1983 | Smith | 219/10.55 A |
| 4,471,192 | 9/1984 | Awata et al. | 34/1 |

Primary Examiner—Albert J. Makay
Assistant Examiner—David W. Westphal
Attorney, Agent, or Firm—Dowrey & Cross

[57] ABSTRACT

An energy efficient dryer for solid foods with moist interiors uses both thermal convective and microwave drying processes. The dryer will run on a fuel such as natural gas alone, and requires no input of electricity because it utilizes a single prime mover to produce both thermal energy and electrical energy, such as an internal combustion engine, which both provides heat for convective drying, and drives a generator which produces electricity for conversion to microwave power. Moist food is fed by an air pervious belt or other means through a first zone in which it is dried by thermal convection, and then through a second zone in which it is dried by microwave radiation.

18 Claims, 3 Drawing Figures

COGENERATION MICROWAVE FOOD DRYER

FIELD OF THE INVENTION

This invention relates to a system and method of drying food products.

BACKGROUND OF THE INVENTION

Solid foods which normally contain moisture in their interiors, such as fruits, vegetables, cereals and grains can be preserved by drying. this drying is conventionally done by purely convective means, in which the solid is exposed to a moving stream of heated air which evaporates the water contained by the solid and carries it away. In conventional belt dryers, the solid product is moved on an air pervious steel belt that passes through a dryer where warm air is blown upwardly through the belt. In fluidized bed dryers, solid particles are suspended in an upward flow of heated air, which dries the particles and carries the moisture away.

Because most food products are sensitive to high temperatures, food dryers operate at low temperatures, often below 100° centigrade. At such low temperatures, drying rates are slow. To achieve a moderate rate of dried product output at low temperatures, a belt dryer must have a long length, and a fluidized bed dryer must have a large volume. The disadvantages of such equipment include high cost, extensive space requirements, and great heat loss. This last problem is significant in the food processing industry, which is a major energy user.

Convective drying removes moisture from the surface of the solid through evaporation. While this occurs, moisture migrates from the inside of the solid to its surface where it is removed by the passing heated air. But, as total moisture content is reduced, the rate of moisture migration declines. This in turn causes a decline in the drying rate, since less moisture is moving to the solid's surface where it can be evaporated off. The surface temperature of the solid then increases because of the decline in evaporation rate. This temperature increase is undesirable because of the potential damage to the temperature-sensitive solid. Such damage includes cracking, splitting, uneven cooking, and other undesirable effects on the quality of the product.

The application of microwave energy during thermal convection drying has been found to accelerate the drying rate even at low temperatures. Because water is an effective absorber of microwave radiation, food solids tend to overheat if microwaves are applied while too large a quantity of moisture remains therein. For this reason, microwave radiation is best applied only after the moisture content of the solid has already been substantially reduced. At this point, where moisture migration rates are low, the use of microwave energy is advantageous in that it will heat the internal moisture and drive it out of the solid.

Up to now, however, the use of microwaves in food dryers has had a major drawback—the requirement that substantial amounts of externally generated electricity be purchased. Since food drying incurs great energy demands, this added energy expense is critical. Furthermore, while microwave drying has been used, it has not been combined with convective drying in the most effective manner, with consideration being given to the effects of both processes on drying rates and surface temperatures.

SUMMARY OF THE INVENTION

The present invention is an energy efficient dryer for solid foods with moist interiors using both thermal convective and microwave drying processes. The invention will run on a liquid or gaseous fuel alone, and requires no input of electricity because it utilizes a single prime mover to produce both thermal energy and electrical energy, such as an internal combustion engine, which both provides heat for convective drying, and drives a generator which produces electricity for conversion to microwave power.

In the present invention, moist food is fed by an air-pervious belt or other means through a first zone in which it is dried by thermal convection, and then through a second zone in which it is dried by microwave radiation. Both the first zone and the second zone may include one or more stages where conditions such as air temperature, humidity, velocity, intensity of microwave radiation, or the like, vary. The number of stages and conditions in each are chosen according to the properties of the material being dried, and the desired output.

In the first zone, heated air passing against the moist solid removes moisture from its surface. While moisture will migrate from the interior of the solid to the surface, at some point this moisture transport mechanism is no longer able to move a sufficient amount of moisture from the interior of the product to the surface in order to maintain a low, non-damaging temperature at the exterior of the solid through evaporation. At that point, the addition of microwave radiation to drive moisture from the inside of the solid, to the application of heated air to the solid, becomes advantageous in accelerating the drying rate and maintaining low surface temperatures.

DETAILED DESCRIPTION OF A PREFERRED EMBODIMENT

Figure 1:
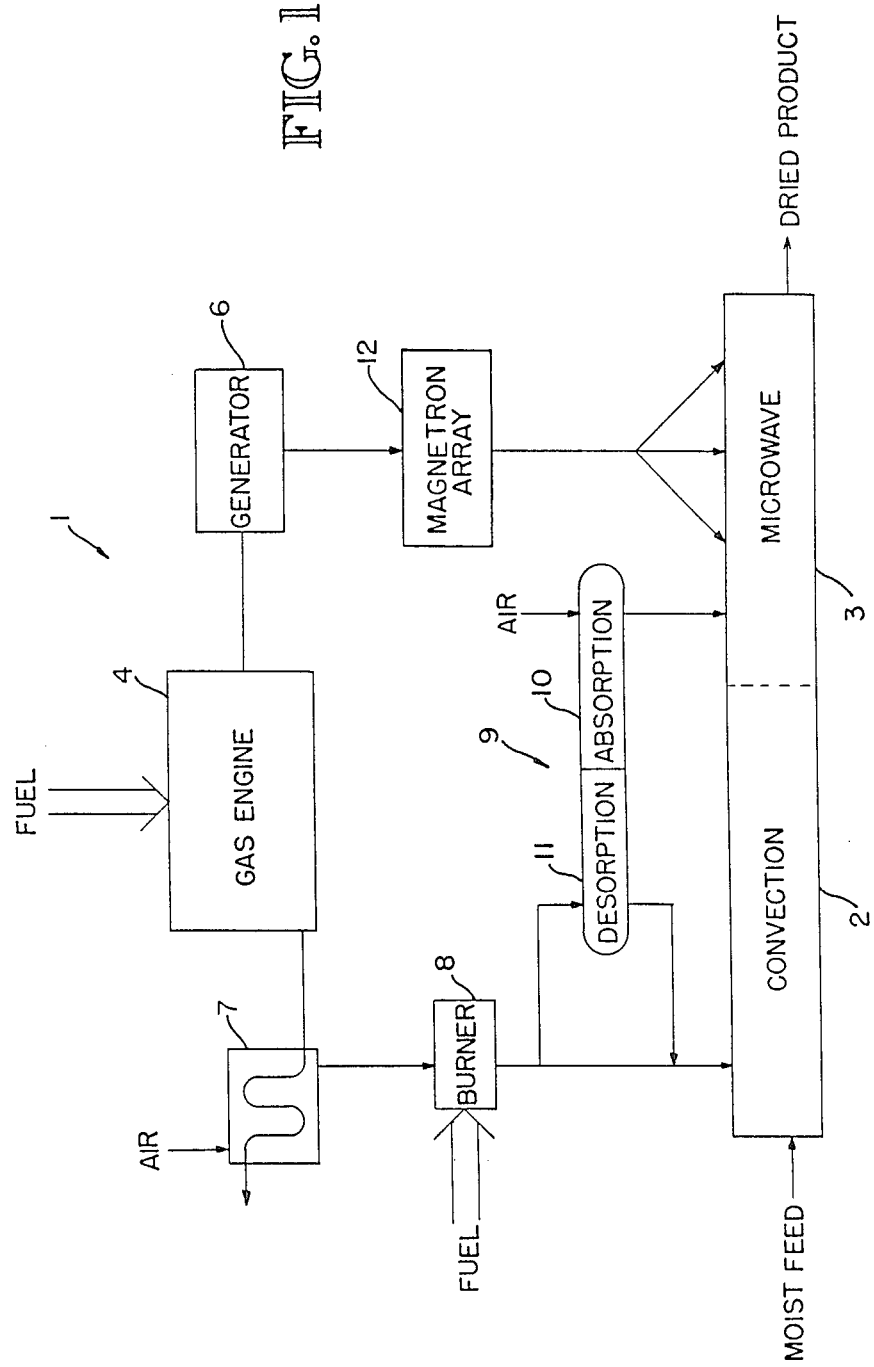
FIG. 1 is a schematic diagram of a preferred embodiment the present invention.

Referring to FIG. 1, in a food dryer 1 according to the present invention moist food is transported on an air pervious belt, or by other suitable means, through a first zone 2 in which convective thermal drying takes place, and then through a second zone 3, in which both convective thermal drying and microwave drying takes place. Liquid or gaseous fuel, such as natural gas, is fed to a prime mover such as an engine 4 which supplies heat for convective drying and mechanical energy to drive an electrical generator 6 for microwave energy production. The engine 4 can be an internal combustion engine which operates at an efficiency of 30% or more. Thus, approximately 30% or more of the energy output will be in the form of mechanical energy, while the remainder of the energy output of the engine 4 will be given off as waste energy in the form of heat. This waste heat in the engine exhaust gases can be utilized for convective drying by supplying it to a heat exchanger 7 which will transfer the heat to a clean air stream for input into the first zone 2. This prevents contamination of the food by substances found in engine exhaust.

An auxiliary burner 8 supplements the heating of the input air stream to bring it up to a temperature sufficient for convective drying in the first zone 2. In a preferred embodiment of the invention, a sidestream of air from the burner 8 may be fed to a desiccant wheel 9 which is used to dry air before its entry into the second zone 3, where it is used to supplement microwave drying in a manner explained below. The desiccant wheel 9 may be of a conventional design, where desiccant is first positioned in an absorption zone 10 where it contacts an air stream which is to be dried. Adiabatic absorption of moisture by the desiccant will both remove moisture from and elevate the temperature of the air stream which enters the second zone 3. After absorbing moisture from that air stream, the desiccant moves to a desorption zone 11 where it is dried and thus regenerated by a passing air stream which, in a preferred embodiment is the sidestream from the burner 8.

Thirty percent or more of the energy from the engine 4 will be supplied through the engine's drive shaft (not shown) to the electrical generator 6 in the form of mechanical energy. The generator 6 converts the mechanical energy to electricity which powers an array 12 of magnetrons, which convert the electricity to microwaves. Magnetrons are commercially available with low individual power ratings of about 1 kilowatt and operating efficiencies of about 75 percent. The requirements of a specific application can be met by incorporating the desired number of individual magnetrons into the array 12. The microwave radiation, along with a stream of warm, dry air from the desiccant wheel 9, enters the second zone 3 to further dry the food product.

Figure 2:
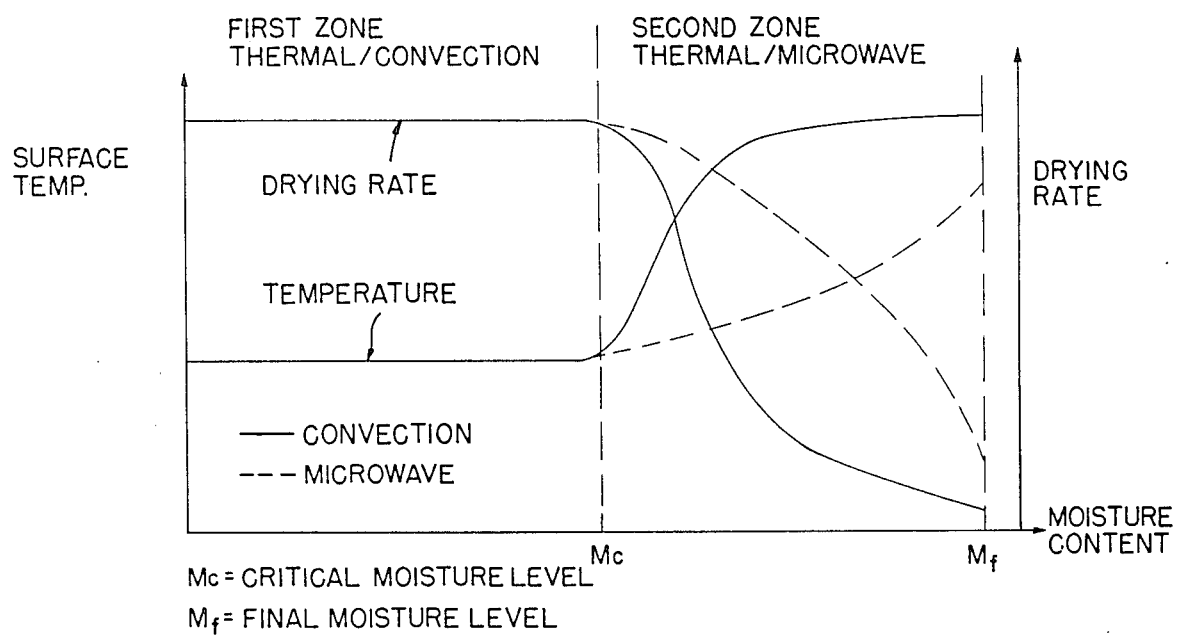
FIG. 2 is a graph of surface temperature and drying rate as a function of moisture content for both microwave and convective drying.

The specific conditions within each zone, such as air temperature, humidity, and velocity, microwave power level, and total time spent in each zone, may be varied according to the material being dried and the dried product output rate desired. The proper conditions can be ascertained by empirical means, such as sampling a food product at various points in the drying process and determining its moisture content, surface temperature, and any other properties which may be of concern. As the solid curves in FIG. 2 show, the drying rate and surface temperature of a solid being dried by convection alone in the first zone 2 will remain constant until a critical moisture content $M_c$ is reached. As the portions of the solid curves to the right of the critical moisture content $M_c$ show, the drying rate will then decrease sharply while the surface temperature increases sharply if drying by convective means alone is continued. The broken lines in FIG. 2 show the effect of microwave drying after the critical moisture level $M_c$ is reached. The application of microwaves will increase the drying rate and lower the surface temperature, resulting in less chance of damage to the finished product.

Figure 3:
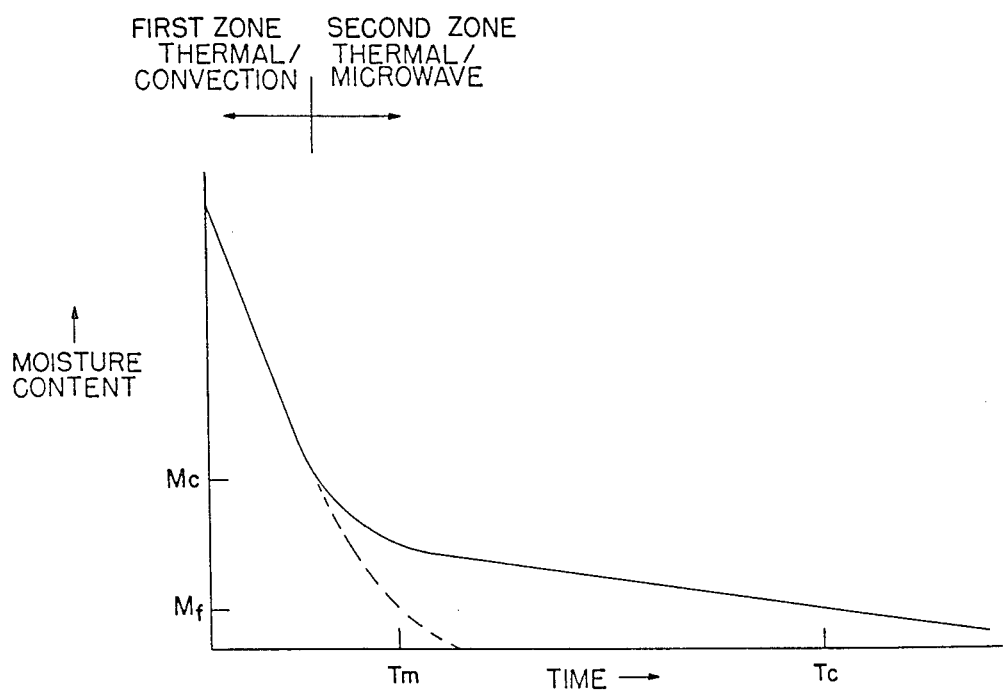
FIG. 3 is a graph of moisture content as a function of time for convective and microwave drying.

FIG. 3 shows the total drying time, $T_c$, to be considerable if the product were left to dry by conventional convective means alone. But, if the first and second zones are configured, by an appropriate belt length, transport speed, or other suitable means, so that the solid is moved from the first zone 2 to the second zone 3 at about the time that the critical moisture content level $M_c$ is reached, the total drying time is shortened to a point indicated as $T_m$ in FIG. 3. This optimal point at which the transition from the first zone 2 to the second zone 3 should occur can be determined by empirical methods.

The simultaneous use of microwave and convection drying with warm, dry, desiccant-treated air in the second zone is advantageous because, as the microwave radiation drives moisture to the exterior of the solid, the warm, dry air evaporates it off, keeping the surface temperature low and the drying rate high. It is further advantageous in lowering the bacterial count in solid food, since it reduces exposure of the solid to the warm, moist conditions which favor bacterial growth.

The following examples illustrate two particular applications of a preferred embodiment of the invention. For comparison purposes, all quantities of fuel and energy have been expressed in the equivalent quantity of power measured in kilowatts.

EXAMPLE 1

PASTA DRYER

Four thousand pounds of moist pasta per hour can be fed into a dryer 1 with 140 kilowatts of fuel powering the engine 4. Ninety-eight kilowatts in the form of waste heat will enter the heat exchanger 7, which in turn feeds an air stream containing 88 kilowatts of power to the burner 8. With 175 kilowatts of fuel feeding the burner 8, an airstream containing 263 kilowatts of thermal power is delivered into the first zone 2 for convective drying.

Fourty-two kilowatts of mechanical power will be supplied by the engine 4 to the generator 6. At 95% efficiency, the generator 6 will produce 40 kilowatts of electrical power. This is sufficient to drive a magnetron array 12 which will supply 30 kilowatts of microwave power into the second zone 3. The total product output of the pasta dryer will be 3250 pounds of dried product per hour.

In this example, 315 kilowatts, in the form of natural gas, is supplied to the dryer 1. No purchased electricity is necessary. This compares favorably with the approximately 379 kilowatts which would be necessary for a comparable output from a conventional dryer using only convection drying. A conventional hot air/microwave dryer would use slightly less total power, about 301 kilowatts, but has the disadvantage of requiring that electricity be supplied by an outside source and the possibility of damage to the product because of high surface temperatures.

EXAMPLE 2

APPLE DRYER

Approximately 600 pounds per hour of moist apples enters the dryer. The engine 4 is powered with 111 kilowatts of fuel and the burner 8 with 196 kilowatts. A resulting 266 kilowatt air stream is supplied to the first zone 2, and 24 kilowatts of microwave power to the second zone 3. Approximately 100 pounds of dried product per hour is produced.

While the invention has for purposes of illustration been described with respect to a particular preferred embodiment and a particular purpose for its use, it will be understood that other embodiments for use in different environments may fall within the scope of the invention.

What is claimed is:

1. A method for efficient removal of moisture from a moist interior solid product with controlled physical change comprising the steps of:

convection heating said solid product with a heated air stream to remove internal moisture to achieve a maximum moisture removal rate while maintaining said product below a predetermined maximum temperature thereby controlling additional physical change to the product, maintaining said convection heating until a predetermined critical moisture content of the product is achieved beyond which critical moisture content the drying rate decreases and the temperature of the product increases above said predetermined determined maximum with continued convection heating due to decreased evaporation and decreased surface migration of moisture, and then exposing said product to microwave radiation to increase moisture migration toward the product surface for removal and evaporation cooling to maintain said product below said maximum temperature until the desired moisture removal is completed, whereby the desired moisture will be efficiently removed from said product while controlling internal and surface physical change to the product.

2. The method of claim 1 including the steps of:
producing thermal and electrical energy with a single fuel powered prime mover,
transferring said thermal energy to a moving air stream to form said heated air stream, and
converting said electrical energy to provide a source of said microwave radiation.

3. The method of claim 2 wherein said thermal energy produced by said prime mover comprises the waste energy therefrom.

4. The method of claim 2 including the step of adding heat energy to said hot air stream from a second thermal energy source prior to convection heating of said solid.

5. The method of claims, 1, 2, 3 or 4 wherein said convection heating is accomplished in a first moisture removal zone and said microwave radiation is introduced in a second moisture removal zone, said hot air stream comprising a first air stream, said method including the steps of:
introducing a second air stream into said second moisture removal zone and
removing moisture and elevating the temperature of said second air stream to a predetermined level prior to introduction to said second zone.

6. The method of claim 5 wherein the temperature of said second air stream is elevated and moisture is removed therefrom by adiabatic absorption.

7. The method of claim 6 wherein said adiabatic absorption is accomplished with a desiccant material and including the step of:
reconditioning said desiccant by desorption with a portion of said first air stream prior to introduction of said first air stream into said first moisture removal zone.

8. The method of claim 1 wherein said solid comprises a foodstuff and said moisture removal is for the purpose of drying to preserve the foodstuff without physical change to the product.

9. A method for drying a solid having a moist interior comprising the steps of:
convection heating said solid with a heated first air stream to obtain a predetermined drying rate and surface temperature in a first drying zone,
maintaining said solid at a said predetermined drying rate and surface temperature for a predetermined drying time, and then
exposing the solid to a microwave radiation to obtain a predetermined final moisture content at a predetermined maximum surface temperature in a second drying zone,
introducing a second air stream into said second drying zone, and
removing moisture from and elevating the temperature of said second air stream to a predetermined level by adiabatic absorption with a desiccant material prior to introduction into said second drying zone, and
reconditioning said desiccant by desorption with a portion of said first air stream prior to introduction of said first air stream into said first drying zone.

10. The method of claim 9 including the steps of:
producing thermal and electrical energy with a single fuel powered prime mover,
transferring said thermal energy to a moving air stream to form said heated air stream, and
converting said electrical energy to provide a source of said microwave radiation.

11. The method of claim 10 wherein said thermal energy produced by said prime mover comprises the waste energy therefrom.

12. The method of claim 10 including the step of adding heat energy to said hot air stream from a second thermal energy source prior to convection heating of said solid.

13. An apparatus for moisture removal from a moist interior solid product comprising in combination;
moisture removal means defining a first
moisture removal zone and a second moisture removal zone,
conveyor means operatively associated with said moisture removal means for transporting said solid product through said first and second moisture removal zones,
hot air convection heating means for producing a heated air stream for heating said solid to remove moisture therefrom to reduce the moisture content to a predetermined critical level while maintaining the temperature of the product below a predetermined maximum thereby achieving a maximum moisture removal rate in said first moisture removal zone,
said conveyor means moving said product into said second moisture removal zone only after the moisture content of the solid product has reached said predetermined critical level, and
microwave radiation means operatively associated with said second moisture removal zone to remove additional moisture from said product to obtain a predetermined final moisture content in said solid while maintaining the temperature said product below said predetermined maximum in said second moisture removal zone.

14. An apparatus for drying a solid comprising in combination;
dryer means defining a first drying zone and a second drying zone,
conveyor means for transporting said solid through said first and second drying zones,
fuel powered prime mover means for producing thermal and mechanical energy, hot air convection heating means including a first air stream for heating said solid to obtain a predetermined drying rate and surface temperatures in said first drying zone, means for transferring said thermal energy to said first air stream, means for adding heat energy to said first air stream prior to introduction thereof into said first drying zone, microwave radiation means operatively associated with said second drying zone to obtain a predetermined final moisture content in said solid at a predetermined maximum surface temperature thereof in said second drying zone, means for transforming said mechanical energy into electrical energy for said microwave radiation means, means to introduce a second air stream into said second drying zone, and conditioning means including means for treating said second air stream with a desiccant material operatively associated with said second air stream to elevate the temperatures thereof to adiabatically remove moisture therefrom prior to introduction into the second drying zone, and means for diverting a portion of said first air stream into contact with said desiccant material to desorb the moisture therefrom prior to introduction of the first air stream into said first drying zone.

15. An apparatus for removing the moisture from a solid material having a moist interior comprising:

moisture removal means providing a first moisture removal zone, a second moisture removal zone and a conveyor for transporting said solid material through said first and second moisture removal zones, fuel powered prime mover means for producing thermal and mechanical energy, air supply means communicating with said moisture removal means and utilizing thermal energy from said prime mover means to provide a stream of heated air to said first moisture removal zone for heating said solid to remove moisture therefrom to reduce the moisture content to a predetermined critical level while maintaining the temperature thereof below a predetermined maximum, microwave energy supply means communicating with said moisture removal means and utilizing mechanical energy from said prime mover means to generate microwave radiation for said second moisture removal zone to remove additional moisture from the solid to obtain a predetermined final moisture content in said solid while maintaining the temperature of the solid below said predetermined maximum.

16. The apparatus of claim 15 including an auxiliary fuel burning means for providing additional thermal energy for use by said air supply means.

17. The apparatus of claim 15 including air conditioning means communicating with said moisture removal means to provide a second stream of heated air for said second moisture removal zone.

18. The apparatus according to claim 17 wherein said conditioning means includes means for treating said second air stream with a desiccant material to adiabatically remove moisture therefrom.

* * * * *